United States Patent
Liao et al.

(10) Patent No.: US 7,357,556 B1
(45) Date of Patent: Apr. 15, 2008

(54) LAMP REFLECTOR FOR USE IN A BACKLIGHT MODULE AND METHOD FOR MAKING THE SAME

(75) Inventors: Super Liao, Hsinchu (TW); Tsung-Sheng Teng, Hsinchu (TW); Tomohisa Tajiri, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/738,777

(22) Filed: Apr. 23, 2007

(30) Foreign Application Priority Data

Dec. 22, 2006 (TW) .............................. 95148668 A

(51) Int. Cl.
*F21V 7/04* (2006.01)

(52) U.S. Cl. .................... 362/614; 362/620; 349/65

(58) Field of Classification Search ............... 362/614, 362/617
See application file for complete search history.

(56) References Cited

U.S. PATENT DOCUMENTS

| | | | |
|---|---|---|---|
| 5,392,199 A * | 2/1995 | Kashima et al. | 362/606 |
| 5,883,684 A * | 3/1999 | Millikan et al. | 349/65 |
| 6,123,430 A * | 9/2000 | Ono et al. | 362/608 |
| 6,572,236 B2 * | 6/2003 | Suzuki et al. | 362/600 |
| 6,935,766 B2 * | 8/2005 | Ato | 362/633 |
| 7,147,357 B2 * | 12/2006 | Kim et al. | 362/608 |
| 2004/0246403 A1 | 12/2004 | Kim et al. | |
| 2005/0237768 A1 * | 10/2005 | Matsumoto et al. | 362/620 |
| 2007/0171675 A1 * | 7/2007 | Sakai et al. | 362/613 |

FOREIGN PATENT DOCUMENTS

JP 08190021 A * 7/1996

* cited by examiner

*Primary Examiner*—Hargobind S. Sawhney
(74) *Attorney, Agent, or Firm*—Thomas, Kayden, Horstemeyer & Risley

(57) ABSTRACT

A reflector for use in a backlight module, and a method for making the same are disclosed. The backlight module includes a light source and a light guide plate. The light guide plate includes a light-entry surface and a light-emitting surface, substantially normal to the light-entry surface. After the light-entry surface of the light guide plate receives the first portion of light emitted from the light source, the light is emitted out of the light-emitting surface via the inner portion of the light guide plate. The reflector comprises a body and a protruding structure. The body defines a space for receiving the light source. The body comprises a first end portion and a second end portion which define the opening. The light-entry surface of the light guide plate substantially faces the light source through the opening. The first end portion is disposed proximal to the light-emitting surface, whereas the second end portion is disposed distal to the light-emitting surface. In addition, the protruding structure is disposed on the first end portion and faces the second end portion so that the second portion of light emitted from the light source is scattered to the light guide plate through the protruding structure.

19 Claims, 7 Drawing Sheets

LAMP REFLECTOR FOR USE IN A BACKLIGHT MODULE AND METHOD FOR MAKING THE SAME

This application claims priority to Taiwan Patent Application No. 095148668 filed on Dec. 25, 2006; the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a backlight module; specifically to a reflector for use in a backlight module and a method for making the same.

2. Descriptions of the Related Art

Common liquid crystal displays (LCDs) primarily comprise a liquid crystal panel and a backlight module. The backlight module provides a light source for the liquid crystal panel to display images on the liquid crystal display. Since the LCD has desirable features, such as thinness, light weight and convenient portability, its demand in recent years has grown rapidly and now dominates the market share.

Generally speaking, several backlight module structures have been developed to meet various requirements. A backlight module that is usually applied in a small sized panel comprises an edge type structure which is characterized by a light source design comprising a light guide plate with side incident light. The edge type backlight module is light, thin and consumes little power. Because of its features, this module has been commonly used as the light source for notebooks.

The backlight module with the edge type structure comprises a light source installed on one side of the whole module for providing light for the LCD. Moreover, the backlight module further comprises a light guide plate and a reflector, wherein the reflector contains the light source that connects with the light guide plate. When the light source emits a light beam, the light guide plate transforms that light beam into a uniform plane light beam for displaying LCD images.

FIG. 1 shows a conventional backlight module 10 comprising a light source 11, a light guide plate 12 and a reflector 13. The display often has separate and contrasting bright and dark stripes, as shown next to the side light source 11. The stripes affect brightness uniformity for the LCD. As shown in FIG. 2, the stripes are usually called MURA defects which may result from many reasons. One of the reasons is that light can leak through a junction between the light guide plate 12 and the reflector 13.

Currently, there are several methods that have been developed to prevent the MURA phenomenon, such as coating light absorption materials on the inner side 14 of the reflector 13 near the junction of the light guide plate 12 to reduce non-uniform brightness. However, this method does not support whole light usage and degrades the overall brightness of the LCD accordingly. Another method coats the light absorption materials on the inner side 14 of the reflector by processing the surface with three to four printing processes to absorb or scatter the light proximal to the junction. Although this method provides slightly more uniform light, there is still an overall loss in the brightness of the LCD. Furthermore, the manufacturing processes are complicated and thus, increase costs undoubtedly.

SUMMARY OF THE INVENTION

One objective of this invention is to provide a reflector for use in a backlight module to improve the occurrence of the MURA defects of the conventional techniques and to increase brightness uniformity of the LCD. The backlight module includes a light source and a light guide plate. The light guide plate comprises a light-entry surface and a light-emitting surface which is substantially normal to the light-entry surface. The light source emits light, of which the first portion is received by the light-entry surface and emitted outwards from the light-emitting surface via the inner portion of the light guide plate.

The reflector of the invention comprises a body and a protruding structure, wherein the body defines the space for the light source. The body comprises a first end portion and a second end portion. These two portions define an opening. The light-entry surface of the light guide plate is directed at the light source through the opening. The first end portion is disposed proximal to the light-emitting surface, whereas the second end portion is disposed distal to the light-emitting surface. Furthermore, the protruding structure is formed on the first end portion and faces the second end portion so that a second portion of the light emitted from the light source is scattered into the light guide plate through the protruding structure.

Another objective of this invention is to provide a method for manufacturing a reflector for use in a backlight module, wherein the backlight module includes a light source and a light guide plate. The light guide plate comprises a light-entry surface and a light-emitting surface substantially normal to the light-entry surface, wherein the light source emits light of which a first portion is received by the light-entry surface and emitted outwards from the light-emitting surface via the inner portion of the light guide plate. This method substantially improves the aforementioned MURA defects and only differs from the conventional manufacturing process with its extra press-forming process. The method comprises the following steps: (1) defining an opening by forming the first end portion and a second end portion opposite thereto so that the light-entry surface of the light guide plate substantially faces the light source through the opening; and (2) forming a protruding structure by press-forming the surface on the first end portion facing the second end portion, so that the second portion of the light emitted from the light source can be scattered into the light guide plate through the protruding structure.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 3:
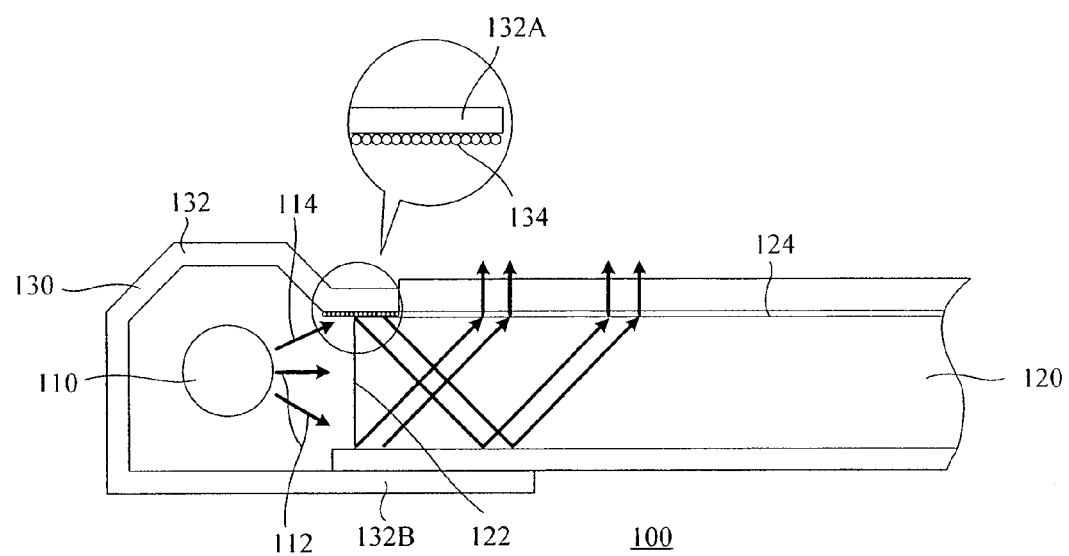
FIG. 3 shows a partial schematic diagram of a backlight module of the invention.

FIG. 3 shows a preferred embodiment of the backlight module of the invention. The backlight module 100 comprises a light source 110, a light guide plate 120 and a reflector 130. It should be noted that only a portion of the light guide plate 120 is shown for simplicity. The remaining parts that are not shown do not differ from prior art techniques so they are omitted herein.

The light source 110 is installed on one side of the whole backlight module to provide light for a liquid crystal panel. For convenience, the invention divides the light emitted by the light source 110 into two portions: a first portion of light 112 and a second portion of light 114, as described in detail later. Furthermore, the light guide plate 120 can be of a wedge structure which comprises a light-entry surface 122 and a light-emitting surface 124 substantially normal to the light-entry structure 122. The first portion of light 112 emitted by the light source 110 is received by the light-entry surface 122 and emitted outwards from the light-emitting surface 124 via the inner portion of the light guide plate 120 along a plurality of designed deflection paths (representative light paths are used in the figure to signify these paths).

The reflector 130 comprises a body 132. In an actual embodiment, the body 132 consists of metal materials, such as aluminum or stainless steel. A desired structure for the body 132 is made by first press-forming a metal sheet and then bending the sheet to define a containing space and opening. The containing space receives the light source 110, while the opening is used for connection with the light guide plate 120 to guide the light emitted from the light source 110 into the light guide plate 120 sufficiently.

Specifically, the body 132 of the reflector 130 comprises a first end portion 132A and a second end portion 132B, wherein the first end portion 132A and the second end portion 132B define the opening. The light-entry surface 122 of the light guide plate 120 substantially faces the light source 110 via the opening. Moreover, the first end portion 132A is disposed proximal to the light-emitting surface 124, whereas the second end portion 132B is disposed distal to the light-emitting surface 124.

The reflector 130 further comprises a protruding structure 134 that is formed on the first end portion 132A, but faces the second end portion 132B. The protruding structure 134 scatters the second portion of the light 113 emitted from the light source 110 into the light guide plate 120 to increase light uniformity within the light guide plate and effectively improve the MURA phenomenon as mentioned in prior art techniques.

In an actual embodiment, the protruding structure 134 of the reflector 130 of the invention is a press-forming structure. Specifically, the protruding structure 134 of the reflector 130 can either be press-formed on the body 132 after the body 132 is press-formed, or combine the press-forming processes of the body 132 and then bend the structure into a specific shape. That is, in this embodiment, the protruding structure 134 of the reflector 130 of the invention is made by press-forming the inner surface of the first end portion 132A of the body 132. Preferably, at least one portion of the first end portion 132A is covered by a portion of the light-emitting surface 124 of the light guide plate 120 so that the light can be scattered into the light guide plate 120 more effectively to reduce the effect of light leakage. As compared to conventional surface processing, the invention simply requires one press-forming step to form the protruding structure or can even combine the press-forming step with the manufacturing of the reflector at the same time. Consequently, the invention can effectively simplify the manufacturing processes and reduce costs. Moreover, the obtained protruding structure has a contour that is better at scattering light, and allows for a longer life of the backlight module.

Figure 4A:
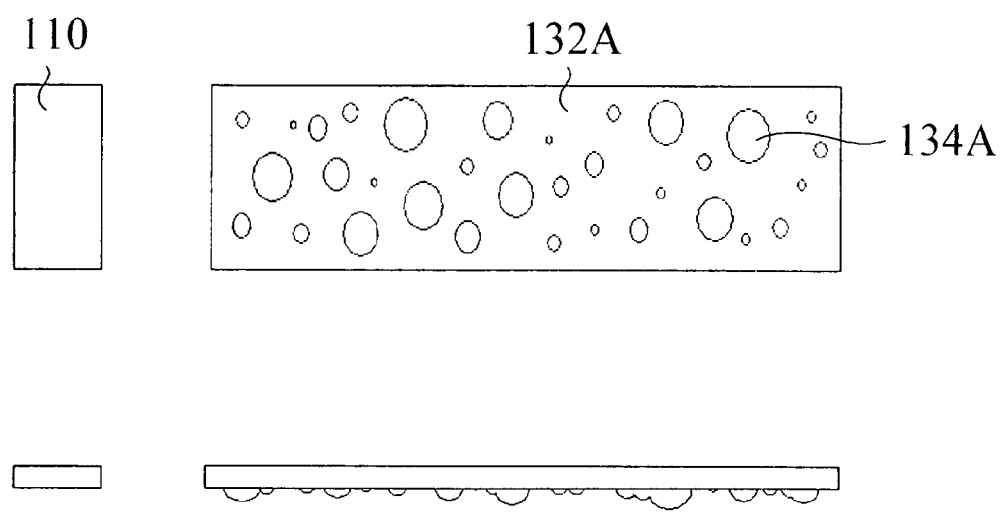
FIG. 4A shows a top view and side view of one embodiment of a protruding structure of the invention.
Figure 4B:
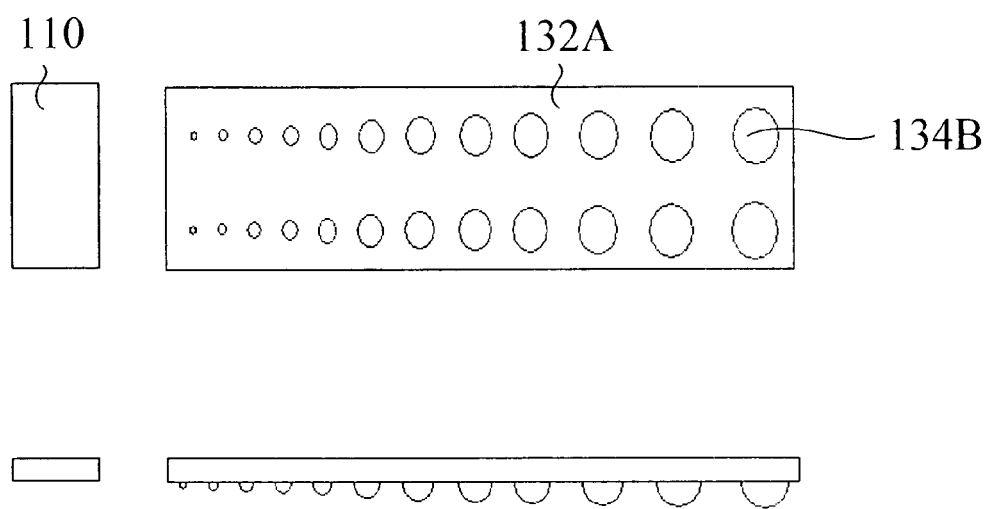
FIG. 4B shows a top view and side view of another embodiment of a protruding structure of the invention.
Figure 4C:
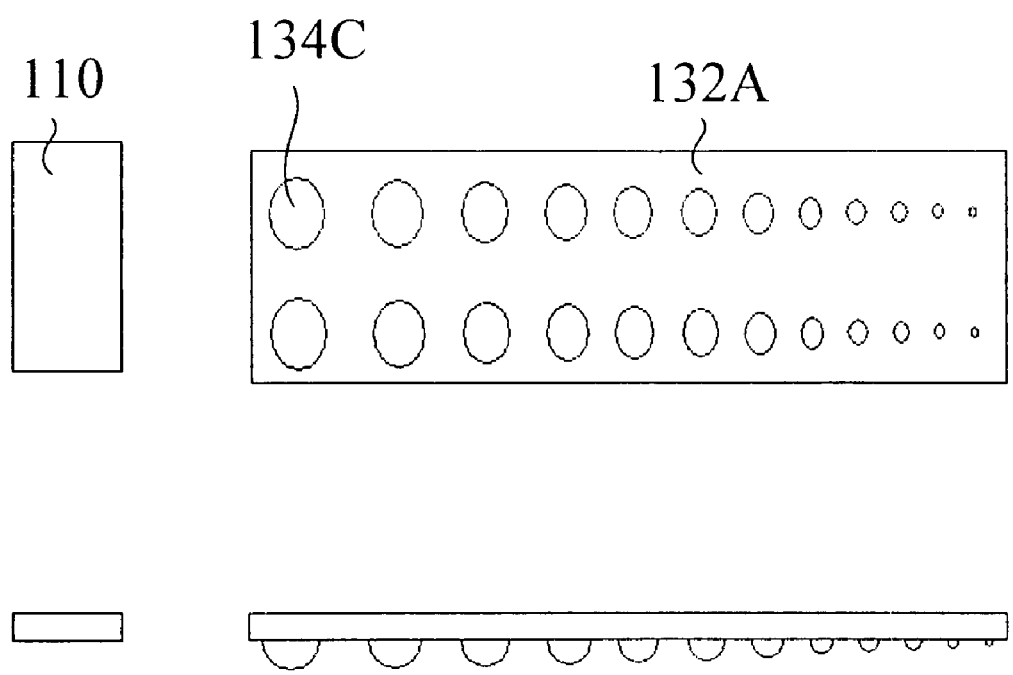
FIG. 4C shows a top view and side view of yet another embodiment of a protruding structure of the invention.

The aforementioned protruding structure 134 has several embodiments depending on the different requirements. For example, the protruding structure 134 can comprise a plurality of protrusions with non-uniform dimensions. Furthermore, the protrusion layouts can vary to meet different requirements. For example, the protrusions 134A can have irregular arrangements (as shown in FIG. 4A), or can be regularly arranged (as shown in FIG. 4B and FIG. 4C) in a matrix array. The protrusions can also have uniform or non-uniform density arrangements. More specifically, each of the protrusions in the matrix array can have different dimensions depending on the requirements. Similarly, densities of the protrusions can also have similar variations. For example, the dimensions and/or densities of the protrusions can increase or decrease gradually away from the light source. The dimensions and densities can even linearly increase (as shown in FIG. 4B), linearly decrease (as shown in FIG. 4C), or both, away from the light source. Each protrusion can be a different shape, such as a circle, angular-shaped, polyhedron (that is, in view of the cross section, a trapezoid with two protruding angles, a tail shape of a necktie with three protruding angles, or a polygon with more than four angles), or the like.

Furthermore, the body comprises an inner surface. Along at least one portion or all of the body, the protruding structure 134 can extend from the first end portion to the inner surface and be disposed thereon. This embodiment can be easily achieved through a press-forming procedure. Since the technique of this embodiment can be understood easily, detailed descriptions or figures are omitted herein.

Figure 1:
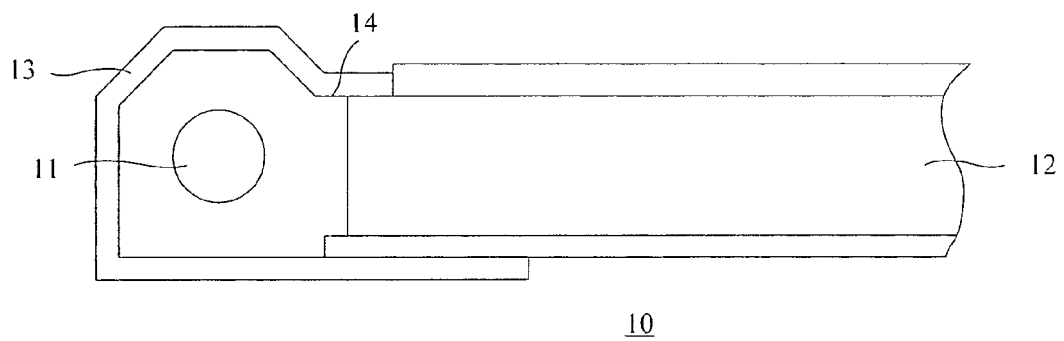
FIG. 1 shows a partial schematic diagram of a prior art backlight module.
Figure 2:
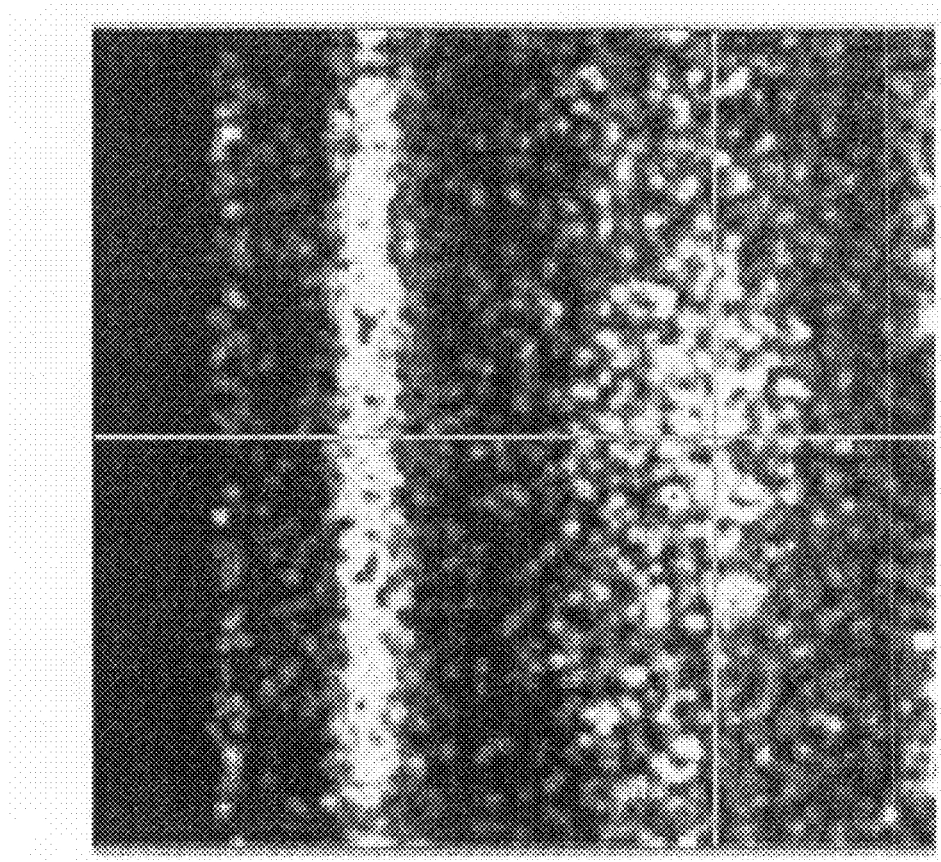
FIG. 2 shows MURA defects comprised in a conventional light guide plate.
Figure 5:
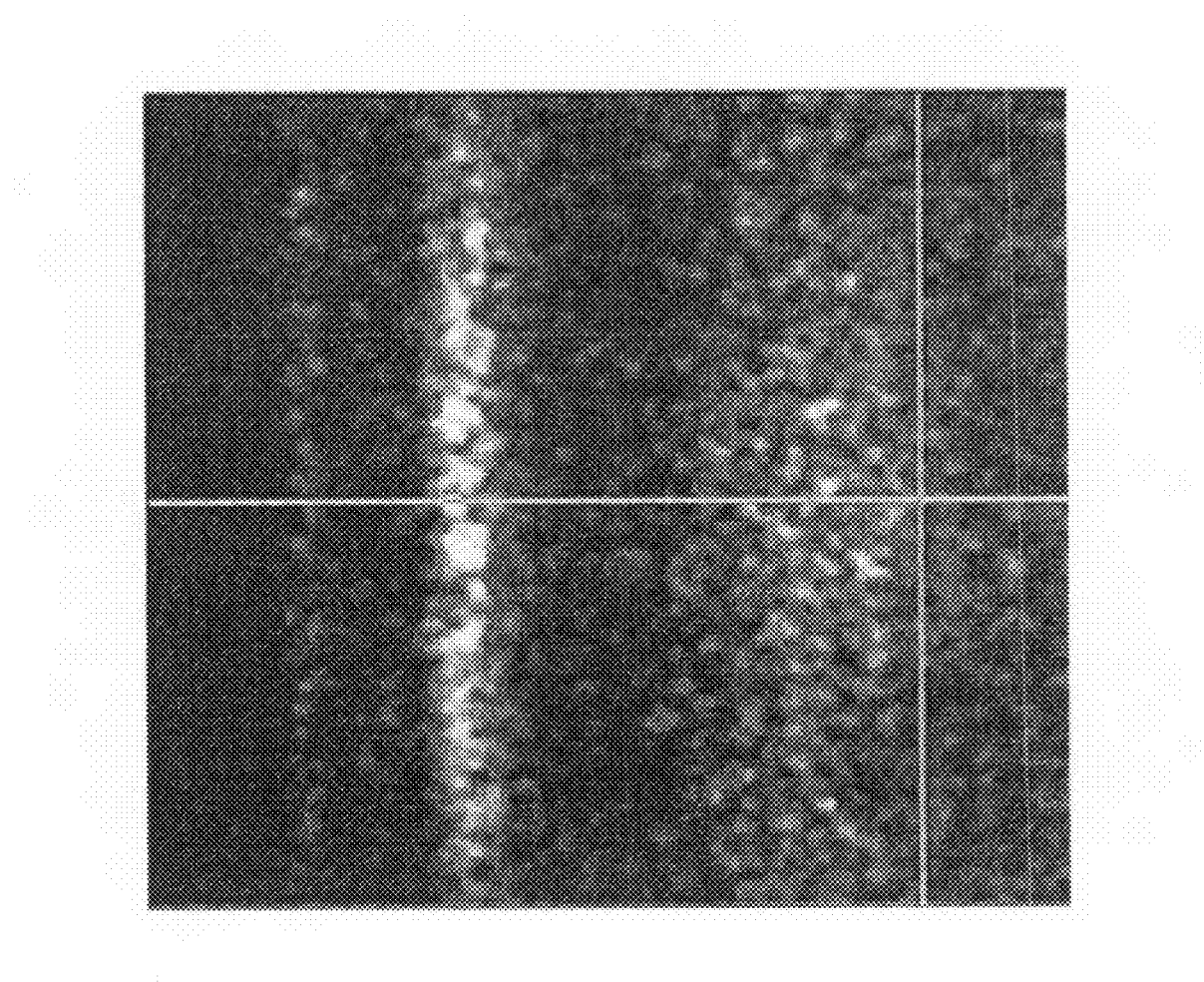
FIG. 5 shows the result of improving the MURA defects using the invention illustrated in FIG. 2.

Thus, the present invention can substantially change the position, strength and uniformity of the bright and dark stripes on the light guide plate according to the different arrangements of the protruding structure on the reflector. For example, if a bright line is close to the light source (as shown in FIG. 2), the protruding structure can be adjusted to generate a varying dimension from small to large (as shown in FIG. 4B) to improve the MURA phenomenon of the area. The improvement condition can be referred to in FIG. 5. As compared with FIG. 2, it is clear that the width of the light band on the light guide plate near the light source is reduced significantly and that the contrast between the bright and dark stripes are also decreased significantly. For an LCD, the remaining light band is hardly detected by the human eye, and thus, the brightness uniformity of the LCD has increased significantly to improve output display quality.

The following description illustrates the method for making a reflector with the aforementioned characteristics. The method comprises the following steps. First, a reflector body shape comprising the first end portion and second end portion opposite thereto is formed by press-forming. Next, a protruding structure is formed on the surface of the first end portion facing the second end portion. The first end portion and the opposite second end portion defines the opening so that the light-entry surface of the light guide plate substantially faces the light source through the opening. The second portion of the light emitted from the light source is scattered into the light guide plate through the protruding structure to increase brightness uniformity of the LCD.

The formation of the aforementioned protruding structure can also extend and form onto at least one portion or the entire inner surface of the body from the first end portion to provide a more flexible manufacturing process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A reflector for use in a backlight module, the backlight module including a light source and a light guide plate, the light guide plate including a light-entry surface and a light-emitting surface, substantially normal to the light-entry surface, wherein the light source emits light of which a first portion is adapted to be received by the light-entry surface and emitted outward from the light-emitting surface via an inner portion of the light guide plate, the reflector comprising:
   a body, defining a space for receiving the light source, wherein the body comprises a first end portion and a second end portion to define an opening, the light-entry surface of the light guide plate substantially faces the light source through the opening, and the first end portion is disposed proximal to the light-emitting surface, whereas the second end portion is disposed distal to the light-emitting surface; and
   a protruding structure, physically formed on the first end portion and facing the second end portion so that a second portion of the light emitted from the light source is adapted to scatter into the light guide plate through the protruding structure.

2. The reflector of claim 1, wherein the protruding structure is a press-forming structure.

3. The reflector of claim 2, wherein the protruding structure comprises a plurality of protrusions with non-uniform dimensions.

4. The reflector of claim 3, wherein the plurality of protrusions are distributed irregularly.

5. The reflector of claim 3, wherein the plurality of protrusions are distributed regularly in an array.

6. The reflector of claim 5, wherein the dimensions of the plurality of protrusions decrease gradually away from the light source.

7. The reflector of claim 5, wherein the dimensions of the plurality of protrusions decrease linearly away from the light source.

8. The reflector of claim 3, wherein the plurality of protrusions comprise a plurality of circular protrusions.

9. The reflector of claim 3, wherein the plurality of protrusions comprise a plurality of angular-shaped protrusions.

10. The reflector of claim 3, wherein the plurality of protrusions comprise a plurality of polyhedron protrusions.

11. The reflector of claim 2, wherein the protruding structure comprises a plurality of protrusions with non-uniform dimensions.

12. The reflector of claim 11, wherein the plurality of protrusions are distributed in a density decreasing gradually away from the light source.

13. The reflector of claim 12, wherein the density of the plurality of protrusions decreases linearly away from the light source.

14. The reflector of claim 1, wherein the first end portion having at least one portion which covers a portion of the light-emitting surface of the light guide plate.

15. The reflector of claim 1, wherein the body comprises an inner surface, and the protruding structure extends from the first end portion to the inner surface along at least one portion of the body.

16. The reflector of claim 15, wherein the protruding structure extends from the first end portion to the inner surface along the body completely.

17. A method for manufacturing a reflector for use in a backlight module, the backlight module including a light source and a light guide plate, the light guide plate including a light-entry surface and a light-emitting surface, substantially normal to the light-entry surface, wherein the light source emits light of which a first portion is adapted to be received by the light-entry surface and emitted outward from the light-emitting surface via an inner portion of the light guide plate, the method comprising the steps of:
   defining an opening by forming a first end portion and a second end portion opposite thereto so that the light-entry surface of the light guide plate substantially faces the light source through the opening; and
   forming a physical protruding structure by press-forming a surface, on the first end portion facing the second end portion, so that a second portion of the light emitted from the light source is adapted to scatter into the light guide plate through the protruding structure.

18. The method of claim 17, wherein the step of forming the protruding structure is to press-form the protruding structure extending from the first end portion to at least one portion of an inner surface of the body.

19. The method of claim 18, wherein the step of forming the protruding structure is to press-form the protruding structure extending from the first end portion to the inner surface of the body completely.

* * * * *